United States Patent [19]
Kell

[11] 3,923,269
[45] Dec. 2, 1975

[54] INERTIA REELS FOR VEHICLE SAFETY BELTS

[75] Inventor: John Kell, Carlisle, England

[73] Assignee: Kangol Magnet Limited, London, England

[22] Filed: Apr. 15, 1974

[21] Appl. No.: 461,125

Related U.S. Application Data
[62] Division of Ser. No. 180,753, Sept. 15, 1971, abandoned.

[30] Foreign Application Priority Data
Nov. 6, 1970  United Kingdom............... 52966/70

[52] U.S. Cl............................................. 242/107.4
[51] Int. Cl............................................. B65h 75/48
[58] Field of Search...... 242/107.4, 107 R; 297/385, 297/388; 280/150 SB

[56] References Cited
UNITED STATES PATENTS

| | | | |
|---|---|---|---|
| 3,552,676 | 1/1971 | Weber | 242/107.4 |
| 3,578,260 | 5/1971 | Kell | 242/107.4 |
| 3,758,044 | 9/1973 | Nilsson | 242/107.4 |
| 3,834,646 | 9/1974 | Heath | 242/107.4 |

Primary Examiner—Edward J. McCarthy
Attorney, Agent, or Firm—Young & Thompson

[57] ABSTRACT

An inertia reel for a vehicle safety belt has an inertia sensing mechanism adjustable as to position within the reel and comprising a bell-shaped pendulum supported on an upright pin. A flat upper surface of the pendulum is engageable on operation with a lever which brings a pawl into engagement with a first ratchet wheel. The ratchet wheel rotates as the belt is pulled from the reel and causes a locking bar to engage further ratchet wheels and thus lock the reel. A modified reel incorporates locking means responsive to belt withdrawal at more than a predetermined speed. In another modification, engagement of the pawl with the first ratchet wheel causes locking movement of the locking bar by way of rotation about the reel axis of a member on which the pawl is journalled.

10 Claims, 11 Drawing Figures

INERTIA REELS FOR VEHICLE SAFETY BELTS

This is a division of application Ser. No. 180,753, filed Sept. 15, 1971, abandoned.

This invention relates to inertia sensing mechanisms for use in inertia reel devices for vehicle safety belts.

The invention provodes an inertia reel device, the mechanism comprising a pendulum formed with a recess, and a mounting member having a free end receivable within the recess for pendulously mounting the pendulum.

The pendulum may be conical or bell-shaped and is preferably weighted around the mouth of the recess. The pendulum conveniently has a flat upper end surface for co-operation with the locking arrangements of the inertia reel.

The invention will be more readily understood from the following illustrative description and from the accompanying drawings, in which.

Figure 1:
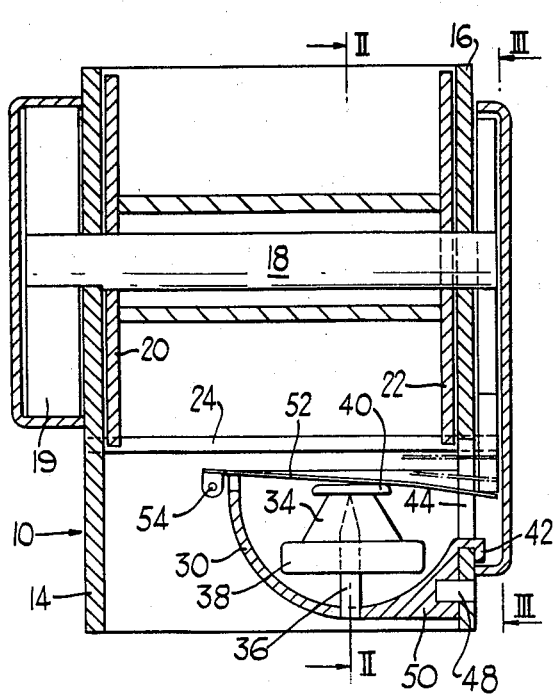
FIG. 1 is a part sectional side view of a first inertia reel embodying the invention.
Figure 2:
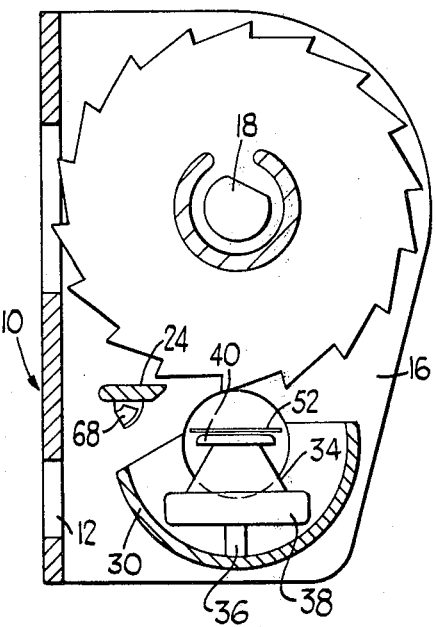
FIG. 2 is a sectional view taken on the line II—II in FIG. 1.

The inertia reel shown in FIGS. 1 to 4 has a body formed by a generally U-shaped pressing 10 having a base and parallel side limbs 14 and 16. The base is provided with a hole 12, whereby the reel may be mounted in an operating position. A spindle 18, having a spring 19 which urges it to rotate in the anti-clockwise direction, as viewed in FIG. 2, is journalled in holes in the limbs 14 and 16. The spindle 18 carries a pair of flanges 20 and 22 each of which has ratchet teeth on the periphery thereof shaped to co-operate with a locking bar 24 to oppose rotation of the spindle 18 in the clockwise direction as viewed in FIG. 2.

The locking bar 24 is mounted in triangular apertures in the limbs 14 and 16 of the U-shaped pressing 10 which are so shaped that the locking bar 24 is disposed with one edge permanently in engagement with one corner of each of the apertures. The bar 24 can be tilted between a position (FIG. 4) in which the other edge thereof is adjacent to a second corner of each of the apertures, the bar then engaging with the ratchet teeth on the flanges 20 and 22 to prevent rotation of the spindle 18 in the clockwise direction as viewed in FIG. 2, and a position (FIGS. 2 and 3) in which the other edge is adjacent a third corner of each of the apertures, the bar being clear of the ratchet teeth so that the spindle 18 is free to rotate in either direction.

An inertia sensing mechanism mounted in the lower part of the reel comprises a generally bowl shaped support member 30. A generally conical or bell-shaped pendulum 34 is supported on the point of a pin 36 secured to and projecting upwardly from the lowest point of the floor of the support member 30. The point of the pin 36 is received in the apex of the conical interior of the pendulum 34, which is weighted around its mouth by a thickened rim 38. Externally, at its upper end, the pendulum has a plate-like portion 40 with a flat upper surface. If undisturbed, the pendulum 34 will be understood to rest on the pin 36 with its axis vertical, the upper surface of the plate-like portion 40 being then horizontal.

Figure 3:
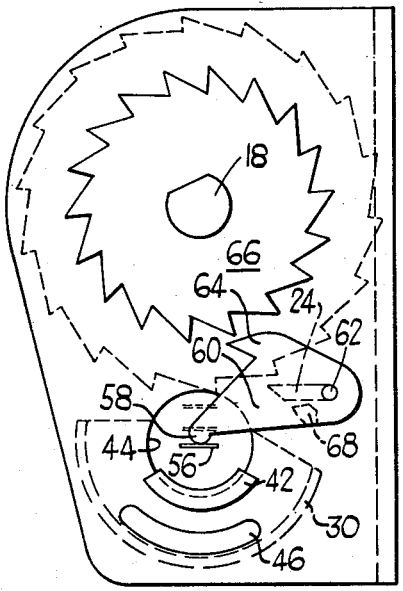
FIG. 3 is a sectional view taken on the line III—III in FIG. 1.

The support member 30 is secured to the limb 16 of the pressing 10. As appears from FIG. 1, a part of the rim of the support member is formed with an arcuate overturned lip 42 which extends through a circular aperture 44 in the limb 16 and engages the outer side of the limb. The limb also has an arcuate slot 46 below the aperture 44 and concentric with it (FIG. 3). A pin 48 extends through the slot 46 into a bore in a flange portion 50 of the support member 30. Because of the arcuate form of the lip 42 and the slot 46, the position of the support member can be adjusted angularly about the axis of the aperture 44 and the member secured in a chosen position by manipulation of the pin 48. The position is chosen so that the pin 36 is at least approximately vertical.

A flat trigger arm 52 is carried on the support member 30 for pivotation about an axis 54 which is horizontal, due to selection of the position of the member. The arm 52 extends across the pendulum 34 and is slightly downwardly inclined so as normally to rest on the edge of the plate-like portion 40 remote from the axis 54. The arm 52 is very light and does not appreciably effect the normal position of the pendulum. The free end portion 56 of the arm 52 is narrower than the part overlying the portion 40 and extends through the aperture 44 to underlie a part circular abutment portion 58 of a pawl member 60 pivoted on the outer side of the limb 16 about an axis 62 which is aligned with the effective pivot axis of the locking bar 24. The pawl member 60 has a pawl tooth 64 engageble with but normally displaced from the teeth of a ratchet wheel 66 carried by the spindle 18 for rotation therewith. The pawl member also has an abutment 68 which extends through an aperture 70 in the limb 16 to underlie the locking bar 24 in the normal position of the mechanism.

Figure 4:
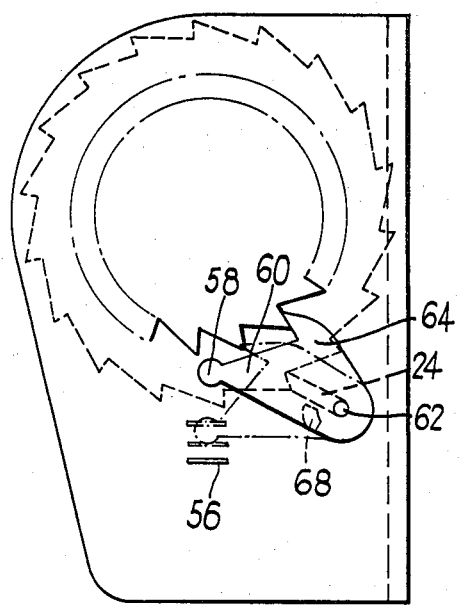
FIG. 4 is a sectional view similar to FIG. 3, showing the inertia lock mechanism in its locking position.

In use, the parts of the mechanism have the positions shown in FIGS. 1, 2 and 3, in which the tooth 64 is disengaged from the ratchet wheel 66 and the locking bar 24 is disengaged from the ratchet on the flanges 20, 22. The spindle 18 is thus free to rotate in either direction, to pay out the belt wound thereon, or to retract it under the tension of the spring 19. If now the reel is subjected to a sufficient acceleration, the tilting of the pendulum 34 will cause the plate-like portion 40 thereof to lift the trigger arm 52 so that this pivots about the axis 54 and the free end portion 56 lifts the abutment portion 58 of the pawl member 60. Only a very small angular movement of the member 60 about the axis 62 is sufficient to bring the tooth 64 into range of the teeth of the wheel 66. The acceleration to which the device is subject will cause a pull on the belt, so that the spindle 18 and thus the wheel 66 will be rotating anticlockwise as seen in FIGS. 3 and 4. On further rotation of the spinle, the engaged tooth of the wheel 66 will thus act on ne tooth 64 to pivot the pawl member 60 further about ne axis 62, sufficient to cause the abutment 58 to tilt ne locking bar 24 into the position of FIG. 4 in which engaged with the teeth on the flanges 20, 22 to prevent further withdrawal of the belt from the reel.

It should be appreciated that the edge of the locking ar 24, the tooth 64 and the various ratchet teeth are shaped that, if tension is maintained on the safety elt wound on the spindle 18, the locking mechanism retained in the locked condition even if the pendulum returns to the vertical. When this tension is removed, the spring 19 tends to rotate the spindle 18 in ne winding up direction. The sloping backs of the atchet teeth on the flanges 20 and 22 then push the ocking bar 24 from the position shown in FIG. 4 to the osition shown in FIGS. 2 and 3, the teeth of the wheel 6 similarly acting on the tooth 64 to cause the pawl nember 60 to return to the normal inoperative position. The pendulum 34 will already have returned to ne vertical due to the acceleration having ceased so nat the trigger arm 52 will fall back to the position nown in FIGS. 1, 2 and 3.

The illustrated inertia reel can be constructed relatively cheaply. The only parts which have to take the nain load when the reel is locked are the U-shaped ressing 10, the spindle 18, the flanges 20 and 22 and ne locking bar 24. All of these parts can be fabricated s pressings.

Figure 5:
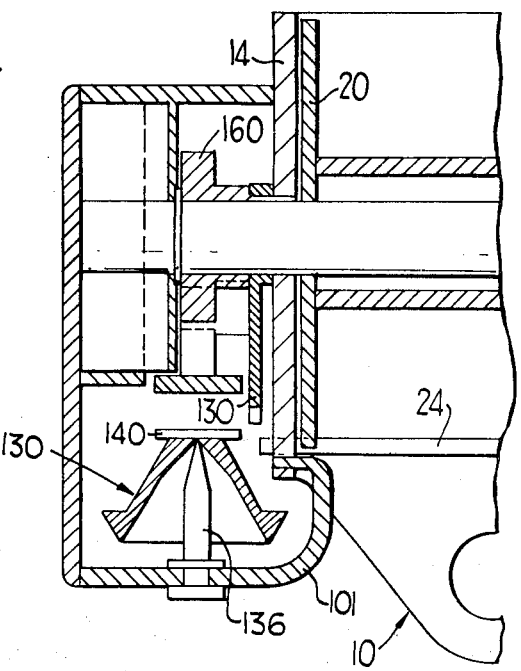
FIG. 5 is a partial sectional side view of a second inertia reel embodying the invention.

In the inertia reel of the invention shown in FIGS. 5 o 8, parts corresponding to parts in the reel of FIGS. to 4 are indicated by the same reference numerals as re used in the earlier figures.

In the inertia reel of FIGS. 5 to 8, the inertia sensing nechanism is accommodated in a housing 101 secured o the side limb 14 and receiving the end of the spindle 8 projecting therethrough. The housing 101 contains ne spring 19. A conical or bell-shaped pendulum 134, upported internally on the point of a pin 136 secured o and projecting upwardly from the floor of the housing 101, has a thickened rim 138 and an upper plate-ke portion 140 with a flat top surface.

A member 130 is rotatably carried on the spindle 18 within the housing 101, preferably in a manner such nat rotation of the member is frictionally opposed, and pawl 148 is mounted on the member by means of a ivot pin 150. The pawl 148 has a lateral projection 52 which is disposed above the pendulum portion 40, and a tooth 158. When the pawl 148 is in the inoperative position of the mechanism, the tooth 158 is just lear of the teeth of a ratchet wheel 160 mounted on ne spindle 18 within the housing 101.

Figure 6:
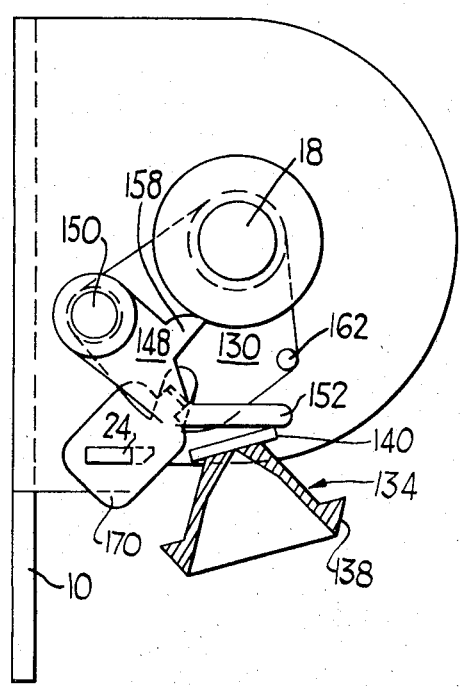
FIGS. 6, 7 and 8 are respectively partial, complete and partial sectional end view on the line VII—VII of FIG. 5, the inertia locking mechanism being shown respectively at the first, an intermediate, and the final stages of operation of the inertia locking mechanism.
Figure 7:
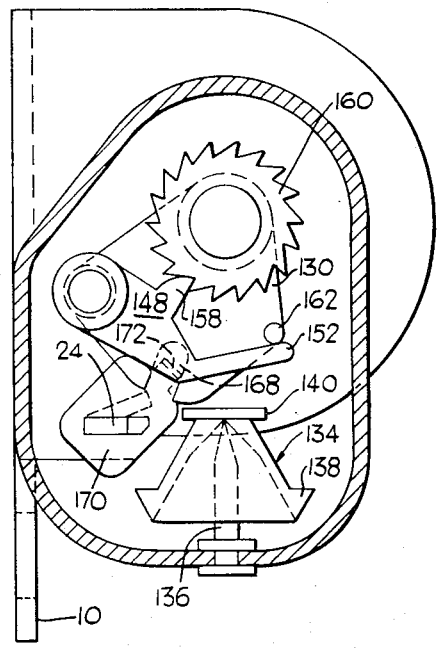
Figure 8:
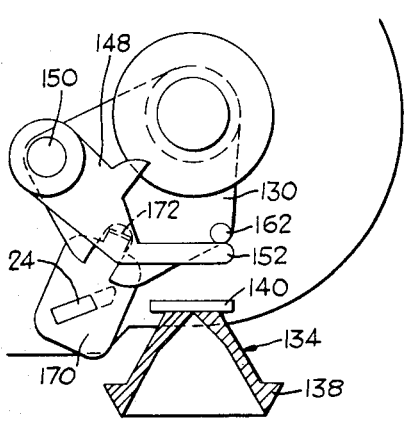

When the mechanism is not subject to acceleration, ne pendulum 134 hangs vertically. If the reel is then ubject to acceleration, the pendulum 134 is readily deected from the vertical, as shown in FIG. 6, causing ne plate-like portion 140 to engage the projection 152 f the pawl 148. This causes the pawl 148 to rotate bout the pivot pin 150 until the tooth 158 is in a posion to engage with the teeth of the ratchet wheel 160. Any subsequent rotation of the spindle 18, due to tension in the strap of the safety belt, causes the ratchet heel 160 to rotate the pawl 148 further, until the proection 152 is in contact with a stop 162 mounted on ne member 130, as shown in FIG. 7. Thus, any further otation of the spindle 18 will cause the member 130 o rotate about the spindle.

An operating element 170 is mounted on the end of the locking bar 24 adjacent to the member 130 and a tongue 172 on the operating element extends into a radial slot 168 in the member. Thus, when the locking mechanism is in the position shown in FIG. 7, further rotation of the spindle 18 following engagement of the projection 152 of the pawl 148 with the stop 162, causes the operating element 170 to move the locking bar 24 from the position shown in FIGS. 6 and 7 to the position shown in FIG. 8. In this position, the locking bar 24 engages with the ratchet teeth on the flanges 20 and 22 so as to prevent further rotation of the spindle 18 in the unwinding direction.

It should be appreciated that the edge of the locking bar 24, the tooth 158, and the ratchet teeth with which they engage are so shaped that, if tension is maintained on the strap of the safety belt which is wound on the spindle 18, the locking mechanism is retained in the locked condition even after the pendulum 134 returns to the vertical. When this tension on the strap is removed, the spring 19 tends to rotate the spindle 18 in the winding up direction. The sloping backs of the ratchet teeth on the flanges 20 and on the ratchet wheel 160 then push the locking bar 24 and the tooth 158 from the position shown in FIG. 5 to restore the mechanism to its initial position.

Figure 9:
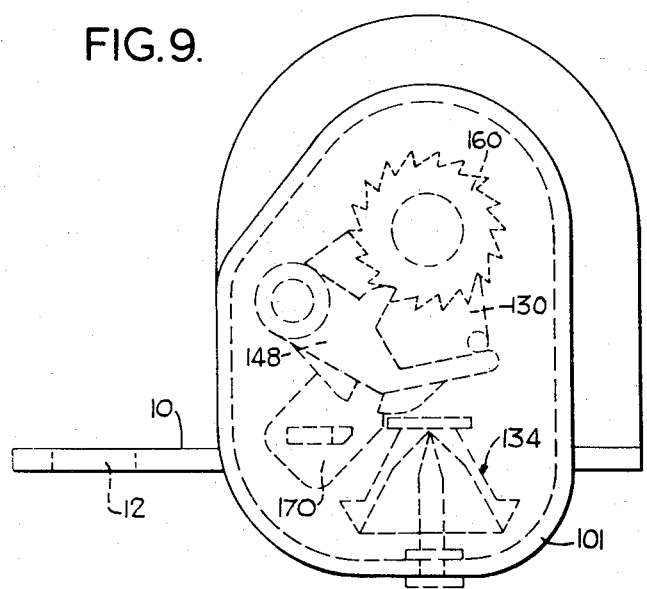
FIG. 9 is a sectional end view showing a modified form of the second reel with parts of the reel rearranged to permit mounting in a different manner.

It will be understood that the inertia reel of FIGS. 5 to 8, like that of FIGS. 1 to 5, is intended to be mounted on a generally upright member, by securement means associated with the hole 12 in the pressing 10. In the inertia reel shown in FIG. 9, the inertia sensitive mechanism is secured to a slide limb of the pressing 10 with a different angular orientation, appropriate to the mounting of the pressing 10 on a generally horizontal surface.

Figure 10:
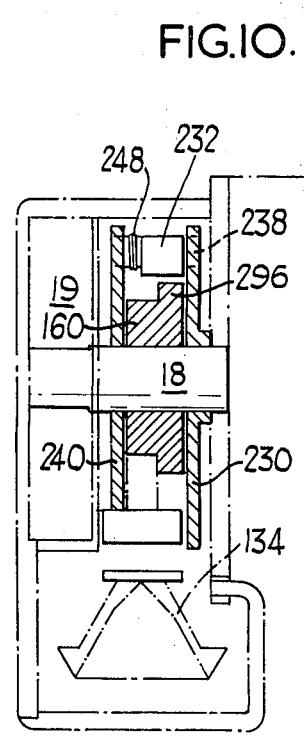
FIG. 10 is a partial sectional side view of a second modification of the reel of FIGS. 5 to 9.

Any of the inertia reels described and illustrated can be readily modified to include a strap sensitive locking arrangement, so that the reels are dual-sensitive. A modification of the inertia reel of FIGS. 5 to 8 for this purpose is shown in FIGS. 10 and 11.

In this modified reel, the pawl 148 is pivoted on a member 230 which serves the function of the member 130 as far as the inertia sensing mechanism is concerned. The member 230 however is of greater area than the member 130 and mounts a pawl member 232, having a locking tooth 234 and an abutment 236, for free rotation on a spindle 238. The spindle 238 is mounted at one end of the member 230 and at the other on a plate 240 also journalled on the spindle 18 and connected to the member by spacers 242, 244 and by a stop 262 co-operating with the projection 152. The pawl member 232 co-operates with a ratchet wheel 246 fast with the ratchet wheel 160 and of larger diameter. A spring 248 coiled on the spindle 238 urges the abutment 236 towards the ratchet wheel 246, holding the tooth 234 clear.

Figure 11:
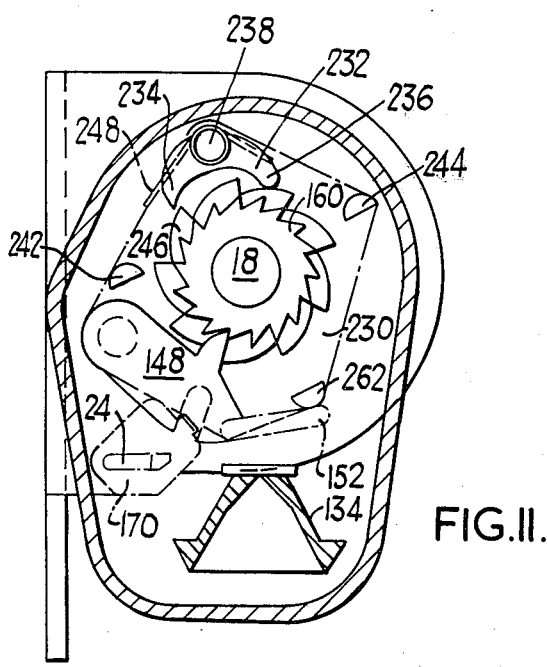
FIG. 11 is a sectional end view of the modified reel of FIG. 10.

In use, withdrawal of the belt from the reel will cause clockwise rotation, as seen in FIG. 11, of the spindle 18 and thus of the wheel 246. Each tooth of the wheel 246 will strike the abutment 236, tending to turn the member 232 on the spindle 238 against the force of the spring 248 to engage the tooth 234 with a tooth of the wheel and so lock the reel against further withdrawal. The forces applied to the member 232 are arranged to be such that the tooth 234 does not engage the teeth of the wheel 246 unless the rate of withdrawal of the belt exceeds a predetermined level. Thus normal withdrawal of the belt is unhindered, but a sharp pull on the belt will result in immediate locking of the reel against further withdrawal.

I claim:

1. A reel device comprising a rotatable reel from which a belt can be unwound against the tension of a rewind spring, a pendulum, an upwardly extending mounting member for the pendulum, the mounting member terminating upwardly in an upstanding free end and the pendulum having a downwardly opening recess receiving the free end, the surface of the downwardly opening recess resting on the free end of the mounting member whereby the pendulum is pendulously mounted by the mounting member, a locking mechanism actuable to lock the reel against rotation in the belt unwinding direction, and means responsive to the tilting of the pendulum through a predetermined angle to actuate said locking mechanism.

2. A reel device as claimed in claim 1 in which the pendulum is substantially bell-shaped.

3. A reel device as claimed in claim 1 in which the pendulum is weighted around the mouth of the recess.

4. A reel device as claimed in claim 1 in which the free end of the mounting member is pointed.

5. A reel device as claimed in claim 1 in which the pendulum has a flat upper surface which is horizontal in the undisturbed position of the pendulum.

6. A reel device as claimed in claim 5 in which said means responsive to the tilting of the pendulum comprises a trigger arm and pivot means mounting said trigger arm to extend across the pendulum so as to be pivoted by said flat upper surface on tilting of the pendulum.

7. A reel device as claimed in claim 6 in which the mounting member comprises a pin, and the device has a bowl-shaped support member having a floor, the pin upstanding from said floor.

8. A reel device as claimed in claim 1 in which the pendulum is a figure of rotation about a vertical axis.

9. A reel device as claimed in claim 1 in which the mounting member is a figure of rotation about a vertical axis.

10. A reel device as claimed in claim 9 in which the pendulum is a figure of rotation about a vertical axis.

* * * * *